Jan. 27, 1959  J. M. HAGGARD ET AL  2,870,928
COMBINATION VEHICLE
Filed Dec. 19, 1955  2 Sheets-Sheet 1

INVENTORS
J. M. HAGGARD
P. H. McMURRAY
BY
Robb & Robb
attorneys

Jan. 27, 1959    J. M. HAGGARD ET AL    2,870,928
COMBINATION VEHICLE
Filed Dec. 19, 1955    2 Sheets-Sheet 2
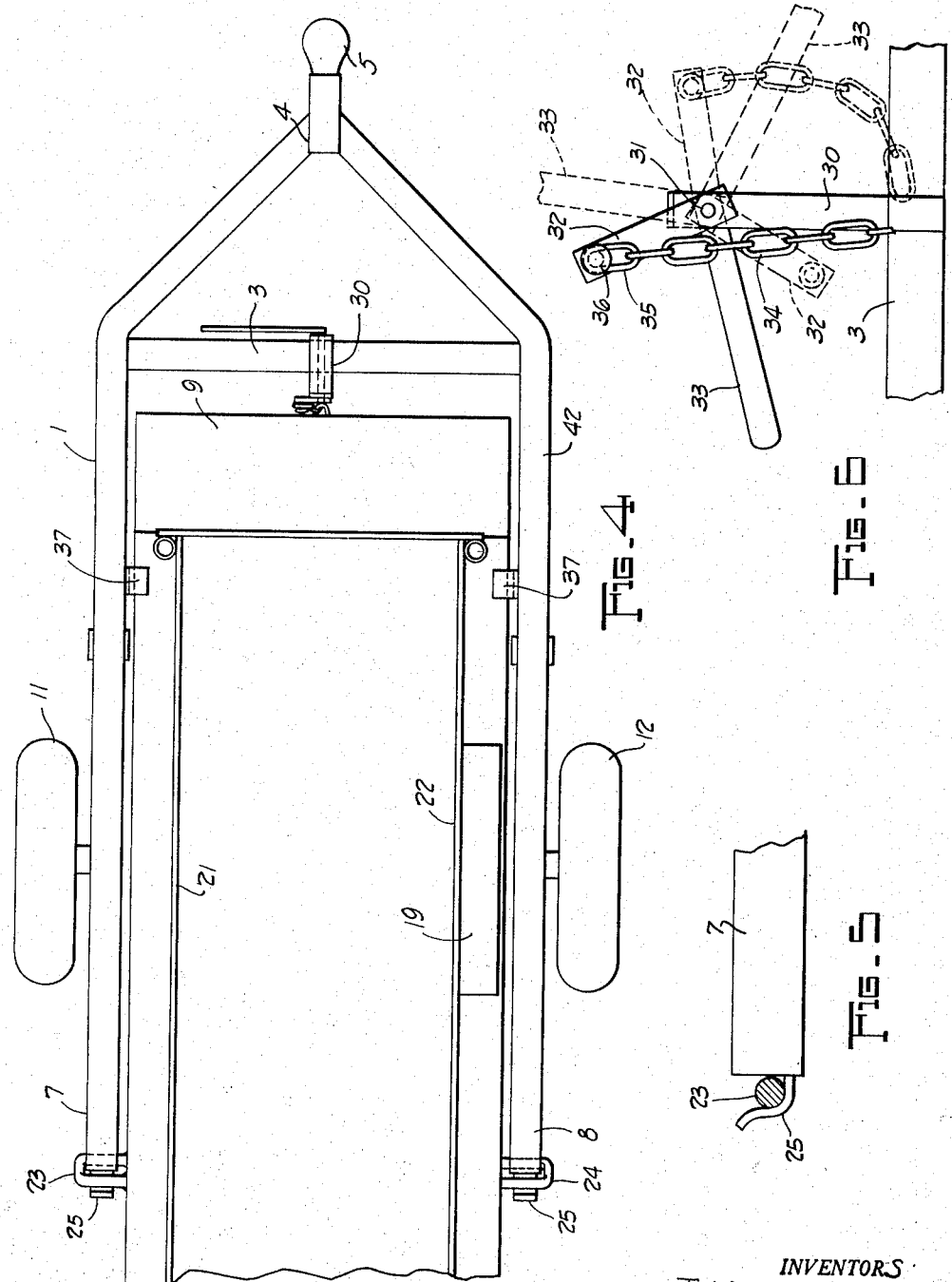
INVENTORS
J. M. HAGGARD
BY P. H. McMURRAY

United States Patent Office 2,870,928
Patented Jan. 27, 1959

2,870,928

COMBINATION VEHICLE

John M. Haggard and Paul H. McMurray, Delphi, Ind., assignors to Delphi Products Company, Incorporated, Delphi, Ind., a corporation Application December 19, 1955, Serial No. 553,887

1 Claim. (Cl. 214—373)

This invention relates to vehicles and primarily vehicles of the trailer type having a frame or chassis adapted to be releasably connected to a body or equivalent, for use where it is desired to place the body on the ground and subsequently raise the same and transport it to another location.

While the vehicle has particular application to farm uses whereby weighing scales, feeders and the like are periodically moved, it is to be understood that use is not limited to those particular purposes.

The general purposes having been outlined it is a principal object of the invention to provide a vehicle or chassis unit which is susceptible of manipulation so as to raise a body or equivalent from the ground, maintain the same in raised position while transporting it, and subsequently lower the body again to the ground.

A further object of the invention is to provide a chassis unit which is of elongated open ended construction whereby the same may be readily positioned so as to at least partly surround a body or the like to be transported, cause hook-like parts at the other end to engage the body, raise that end of the body and by other means provided cause the other end to be subsequently raised and positioned for transport, which may be effected and the body or the like subsequently lowered to the ground and the chassis completely disengaged therefrom.

Yet another object of the invention is to provide a vehicle as heretofore outlined which may be securely fixed to a body raised thereby, and transport effected, the entire unit being substantially rigidly connected while movement takes place.

A still further object of the invention is to provide a frame or chassis of generally U-shaped construction, within which frame a body or platform may be positioned by manipulation of the frame and part carried thereby, said body and frame being fastened together in a manner to impart rigidity to the unit as a whole, the fastening means being releasable whereby the body and frame may be similarly separately usable with other parts corresponding thereto.

Other and further objects of the invention will be understood from a consideration of the specification appended hereto and shown in the drawings wherein:

Figures 1, 2, and 3 show a vehicle constructed in accordance with this invention in the several positions which may be assumed thereby among others, certain of the features being illustrated and it being noted that a supporting wheel is removed to better illustrate the relationship of the parts.

Figure 4 is a top plan view of the vehicle showing a body or platform emplaced therein and the ground supporting or travel wheels related thereto.

Figure 5 is a fragmentary view taken about on the line 5—5 of Figure 4 showing the connection of the chassis or frame with a body part.

Figure 6 is a view somewhat fragmentary in nature illustrating certain raising and lowering means availed of to connect the body and chassis unit.

Figure 1:
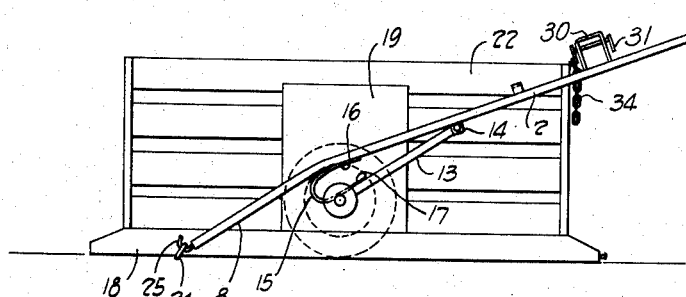

Referring now to the drawings and initially to Figure 4 therein, it will be seen that the chassis unit hereof is of generally elongated U-shaped construction including side members 1 and 2 connected together at their forward ends by means of a cross member 3, extensions of the side members 1 and 2 being brought together and terminating at 4 in a place where a hitch 5 may be fastened thereto as shown.

The side members 1 and 2 are preferably of rectangular tubular construction to provide rigidity as is the member 3 although the frame as a whole is somewhat flexible by reason of the fact that the ends or extremities 7 and 8 respectively of the sides 1 and 2 are in no manner fastened together when the chassis is by itself, that is when the platform or body generally denoted 9 is removed from between the sides 1 and 2.

Figure 2:
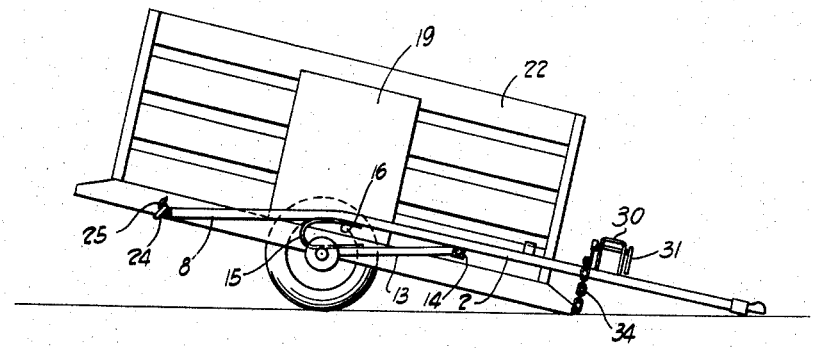
Figure 3:
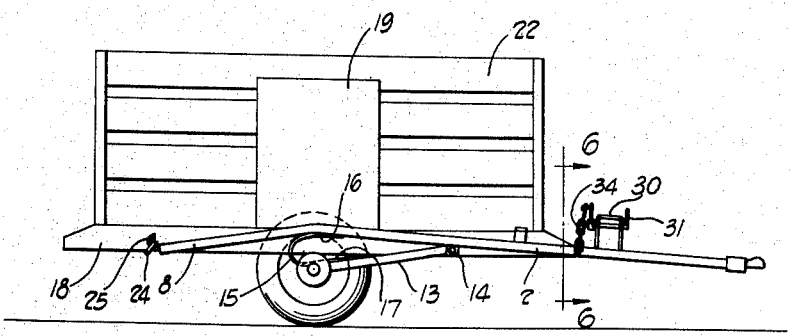

Each one of sides 1 and 2 of the chassis is equipped with a travel supporting wheel in this instance being denoted 11 and 12 respectively for said sides, each of the wheels being fastened in a similar manner to the side and as illustrated in Figures 1, 2 and 3 by means of a pivotal bar denoted 13, pivoted at 14 to the side 2 for example, which bar 13 is provided at its rear end with an offstanding axle assembly to which the wheel 12 is fastened for example. At the rear end of the bar 13, a U-shaped spring 15 is provided, being fastened at its upper end 16 beneath the side member 2 and extending toward the rear thence downwardly and subsequently forwardly so as to engage the bar as indicated at 17, the bar being the bar 13 previously mentioned.

It will thus be seen that the wheels 11 and 12 are in each case mounted on springs at the end of bars 13 or their equivalent, to provide for the necessary springing mounting of the body such as 9 now to be referred to.

The body 9 in this instance is shown as comprising a platform or base member 18, which base member 18 is generally rectangular and as a matter of fact a scale unit being shown here including the scale works housing 19 and the upright sides 21 and 22.

It will of course be apparent that the particular type of mechanism to be carried by the chassis of this device is not particularly important but in this instance it has been found most suitable for use with a scale or similar mechanism.

At the rear of the scale platform 18 or near thereto, are the hangers or trunnions 23 and 24, which hangers or trunnions 24 and 23 are generally U-shaped and comprised of heavy rod for purposes which will become apparent as this description proceeds.

At the ends 7 and 8 of the side members 1 and 2, the said ends are provided with hook-like parts particularly illustrated in enlarged detail in Figure 5 denoted 25, which hook-like parts 25 are adapted to engage the members 23 and 24 so as to be pivotal with respect thereto.

At the forward end of the chassis and mounted on the crossbar 3 is a raising and lowering device which is illustrated in detail in Figure 6 as well as certain details being shown in the other figures of the drawing, comprised of a support 30 of generally U-shaped configuration as viewed in Figure 1 for example which is fastened so as to extend longitudinally of the frame work and equipped with a pivotally supported member 31, which member 31 in turn carries a crank 32 at its extremity, that extremity being the rearward extremity in this particular case the crank 32 being adapted to be operated by a lever illustrated in Figure 6 and denoted 33, connected to the pivotal member 31.

Adapted to be suitably connected to the forward end of the platform 9, is a chain such as 34 illustrated in Figure 6, which chain is provided with a link 35 at its upper end to engage a suitable member 36 at the extremity of the crank 32 whereby manipulation of the crank 32 as by means of the handle 33 will cause the platform 9 to be raised upwardly in the frame from the position shown in Figure 2 for example. The chain may be connected or disconnected at either end to the platform or crank.

Before proceeding with a description of the operation of the device it should be noted that each of the side members 1 and 2 is provided with a stop 37 which stop members are arranged to engage with the upper surface of the platform 18 as will be described.

Assuming that the unit 9 is in the position shown in Figure 1, that is on the ground or some other equally similar surface, the chassis will be manipulated with the tongue 4 upwardly and moved back so as to have the sides 1 and 2 generally surround or be at opposite sides of the platform 18, the hook-like members 25 being thereby engaged with the members 23 and 24 respectively, whereby subsequent downward pressure upon the end or tongue 4 will cause the parts to assume the position substantially as illustrated in Figure 2. Thereafter the chain 34 is hooked on the part 36 with the part 32 shown in the dotted line position of Figure 6 the chain 34 also being in dotted lines, depending therefrom, and by manipulation of the handle 33 through the dotted line positions of Figure 6 so as to move the crank 32 to the position in that figure in solid lines, the position of the parts will thereafter be that shown in Figure 3. The upper surface of the platform 18 will thereby engage the stop members 37 and since chain 34 has been placed under considerable tension and the crank 32 is over center, by movement in a counter clockwise direction from dotted line position to full line position in Figure 6, the entire unit will be thereby locked together and form a rigid trailer vehicle as a whole. It will be understood that since the parts have been manipulated in the manner heretofore described so as to cause the positioning of the scale unit and chassis for transport, subsequent reverse manipulation of the various parts may be resorted to so that the scale may be thereafter positioned at any place where it is desired to locate the same and the trailer chassis disconnected completely therefrom and the scale used for its intended purpose.

It will be readily apparent from the foregoing that where any particular body like member is provided with the parts such as 23, the dimensions being substantially the same as those indicated, can likewise be lifted and carried away by the trailer or chassis and subsequently deposited in a manner as has been set forth. It will thus be apparent that uses of the chassis are extensive and not necessarily limited to the transport of a scale or the like but may be useful in moving feeding devices such as hog feeders from place to place.

We claim:

In a vehicle of the class described, a yoke-like frame comprised of side members having wheel means secured thereto, said frame being closed forwardly and open rearwardly to straddle a body provided with hook-engaging means to be carried by said vehicle; said side members terminating rearwardly in hook means pivotally engageable with said hook-engaging means substantially at the rear of said body; a lifting mechanism carried by said frame forwardly thereof and having means for engaging said body at a forward portion to lift said forward portion so as to pivot said body around said engaged hook means, abutment means comprising horizontal shoulders and vertical shoulders carried by said frame forwardly thereof engageable by said body at the forward portion thereof subsequent to being lifted by said lift mechanism, said lifting mechanism comprising lever means movable beyond dead center for lockingly maintaining tight engagement between said body and said abutment means.

References Cited in the file of this patent
UNITED STATES PATENTS

| | | |
|---|---|---|
| 461,689 | Sherman | Oct. 20, 1891 |
| 2,442,994 | Clary | June 8, 1948 |
| 2,448,443 | Krake | Aug. 31, 1948 |
| 2,545,128 | Young et al. | Mar. 13, 1951 |
| 2,577,246 | Hill | Dec. 4, 1951 |
| 2,603,501 | Graves | July 15, 1952 |